W. F. FOLMER.
FOCUSING DEVICE.
APPLICATION FILED DEC. 12, 1908.
932,458.
Patented Aug. 31, 1909.
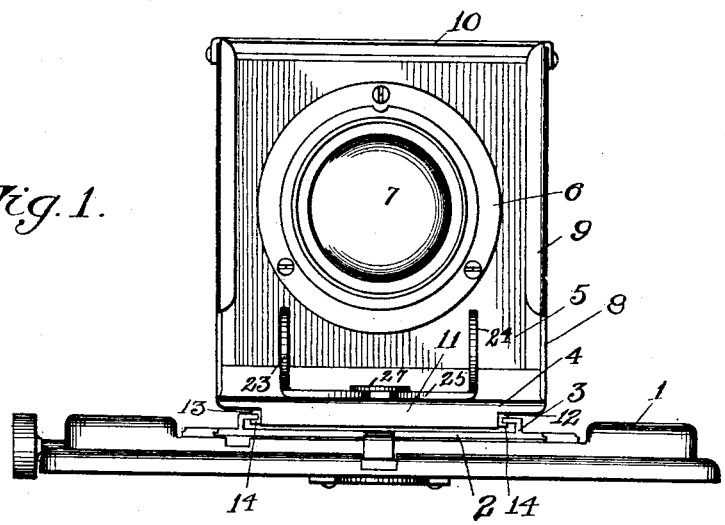
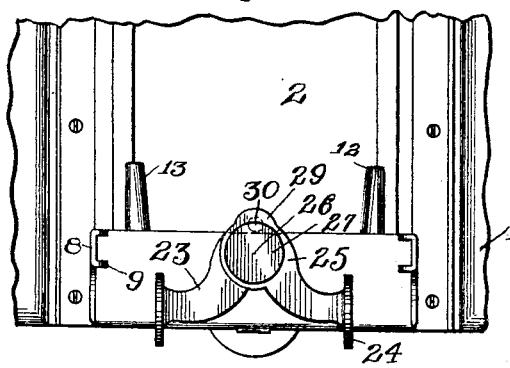
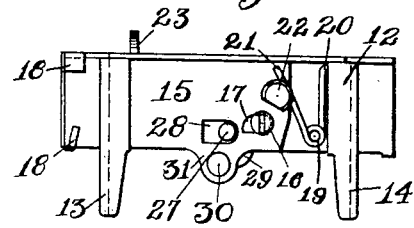
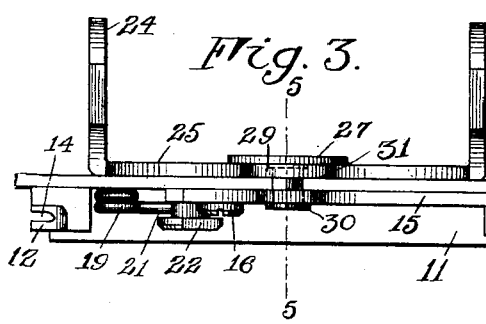
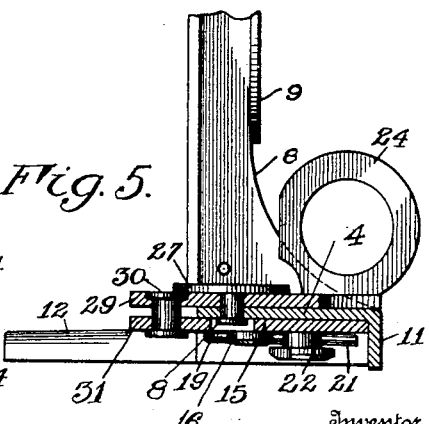
Witnesses
Nelson Copp
Russell B. Griffiths
Inventor
William F. Folmer
By Church & Rich
His Attorneys

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

FOCUSING DEVICE.

932,458.　　　　Specification of Letters Patent.　　Patented Aug. 31, 1909.

Application filed December 12, 1908. Serial No. 467,256.

*To all whom it may concern:*

Be it known that I, WILLIAM F. FOLMER, of Rochester, in the county of Monroe and State of New York, have invented certain new and useful Improvements in Focusing Devices; and I do hereby declare the following to be a full, clear, and exact description of the same, reference being had to the accompanying drawings, forming a part of this specification, and to the reference numerals marked thereon.

My present invention relates to photography and more particularly to photographic cameras and it has for its object to provide an improved focusing device that will be simple and convenient both in manufacture and manipulation, the major part of my improvements being directed toward means for clamping one of the movable parts, the relative positions of which govern the focus, at different points on the bed or support.

To these and other ends the invention consists in certain improvements and combinations of parts all as will be hereinafter more fully described, the novel features being pointed out in the claims at the end of the specification.

In the drawings: Figure 1 is a front elevation of a camera bed and a lens front and carriage mounted thereon, the same being constructed in accordance with and illustrating one embodiment of my invention; Fig. 2 is a top plan view thereof showing a fragment only of the bed and with the lens board removed; Fig. 3 is a rear elevation of the carriage in detail and somewhat enlarged; Fig. 4 is a bottom plan view of the carriage in detail; and Fig. 5 is a vertical central section through the carriage on the line 5—5 of Fig. 3.

Similar reference numerals in the several figures indicate the same parts.

I have in the present instance shown my improvements in connection with the front or lens carriage of the camera and with a bed 1 of a usual type. Arranged on the bed is a way plate 2 having upwardly extending and inwardly turned tracks 3 forming ways upon which the carriage 4 travels upon the bed in the manner hereinafter described carrying the lens board or front 5, lens mount 6 and lens 7. I prefer to form the carriage 4 of a strip of sheet material bending the ends 8 upwardly in parallelism and flanging them inwardly as at 9 from a point slightly above the angle to form grooves for the accommodation of the lens board 5 and to furnish a guide for its vertical adjustment when such is desired. Due rigidity is contributed to the structure by a strap or tie piece 10 connecting the extreme ends of the portions 8. In this way a single piece of metal punched and stamped furnishes practically the whole body of the carriage. One edge of the strip is bent downwardly forming a flange 11 on the carriage extending between the ways 3 and terminating very close to the surface of the bed as defined by the way plate 2 whereby the clamping parts hereinafter described are completely concealed, enhancing the effect of simplicity in appearance which is so desirable and at the same time acting as a clearance plate to prevent a small article left on the bed between the tracks from being jammed in contact with, and from effecting a disarrangement of, the working parts.

On the under side of the carriage plate 4 are secured a preferably rigid friction shoe 12 and a movable friction shoe 13. They are both provided on their outer sides with grooved portions 14 fitting over the edges of the inwardly turned ways 3 and are preferably of sufficient length to give a rather extended bearing against the latter so that the carriage will not be apt to bind upon its guide as it is moved to and fro on these mountings. The movable shoe 13 includes as a part thereof a plate 15 that fits flat against the carriage 4 to extend substantially coincident with the under face thereof and is held against the flange 11 at its front edge, as a guide in its movements relatively to the way and to the companion shoe, by a suitable means such as a slot and pin connection, the headed pin 16 being, in the present instance, secured to the carriage to project through the slot 17 in the shoe plate. Oppositely turned ears or projections 18 on the carriage plate 4 overlapping the outer end of the plate 15 beyond the shoe 13 also contribute to the guiding of the latter. The two shoes, the one rigid with the carriage and the other sliding thereon, have a normal tendency to spread or move relatively in the direction in which they engage the guides through the influence of a tension member secured to one and engaging the other, this member, in the present instance, being in the form of a spring 19 having one arm 20 fixed between the rigidly attached shoe 12 and the flange 11 on the carriage, and the other arm 21 in sliding engagement with a headed projection 22 on the movable shoe plate 15. The means I prefer to employ for releasing these clamping shoes and hence the carriage from their clamping engagement and temporarily fixed position on the ways is arranged upon the top of the carriage plate and, as illustrated, comprises a fixed finger piece 23 and a movable finger piece 24, the latter being the forward and longer arm of a lever 25 pivoted at a point 26 centrally of the carriage and intermediate the ways on a headed stud 27 which passes through and is riveted upon the carriage plate, the lower end being accommodated within a slot 28 in the shoe plate 15 to prevent it from interfering with the movements of the latter. The short end 29 of the lever 25 projects beyond the rear edge of the carrage and is pivoted at 30 to a rearward extension 31 on the shoe plate 15.

The operation of the device is obvious, the interposed frame 19, as before described, operating normally to press the shoes 13 and 14 in opposite directions against the ways 3 and to clamp the carriage, and the parts carried thereby, in a temporarily fixed position of adjustment on the bed for the purposes well known to those familiar with the art. When it is desired to release the carriage or front to change the adjustment the operator has merely to exert a pressure with his fingers on the finger pieces 23 and 24, tending to move them inwardly or toward each other whereupon the movable lever 25, by its pivotal connection at 30, retracts the sliding shoe 13 against spring 19 and separates both shoes from the ways and with the grip upon the finger pieces the carriage is moved to and fro as desired. The stationary finger piece 23 could, of course, in some instances be dispensed with, but it is convenient to provide an opposing pressure member.

A device constructed in accordance with my invention will be noticed to be neat and attractive in appearance as well as extremely simple, and by arranging the controlling members centrally of the carriage they are prevented from protruding laterally therefrom in such a manner as to constitute inconveniently projecting parts that would interfere with other manipulations about the camera and reduce the storage capacity of the chamber in the latter sometimes employed for the storage of the front, bed and other parts.

I claim as my invention:

1. In a camera, the combination with a bed having parallel ways thereon, of a carriage movable on the bed and embodying a strip or plate extending transversely of the ways, having one edge thereof bent downwardly to extend between the ways, a fixed shoe on the under side of the carriage in rear of the flange adapted to engage the inner side of one way, a sliding shoe similarly arranged to move toward and from the other way and embodying a plate extending substantially coincident with the under face of the carriage and forming an extended bearing against the flange on the latter as a guide, projections on the carriage engaging over the edges of the plate to retain it against its guiding flange, a spring for normally holding the sliding shoe against its way and means for releasing said shoe.

2. In a camera, the combination with a bed, having parallel ways thereon, and projecting upwardly therefrom and a carriage movable on the bed, of friction shoes arranged on the under side of the carriage between the ways together with means for operating them relatively to the ways and a protecting flange on the forward edge of the carriage extending downwardly from the latter between the ways to a point below the shoes and their said operating means.

3. In a camera, the combination with a bed having ways thereon and a carriage movable on the bed comprising a plate having a downwardly turned flange extending between the ways, of a fixed shoe on the under side of the carriage engaging the inner side of one way a similarly arranged, sliding shoe engaging the inner side of the opposite way and contacting the flange as a guide, means for operating said sliding shoe relatively to its way and means for retaining it against its guide.

4. In a camera, the combination with a bed having parallel ways thereon, of a carriage movable on the bed and embodying a sheet metal strip extending transversely of the ways, the ends of the strip being bent upwardly to form a lens board support and one edge thereof being bent downwardly to extend between the ways, a fixed shoe on the under side of the carriage in rear of the flange adapted to engage the inner side of one way, a sliding shoe similarly arranged to move toward and from the other way and having a slot and pin connection with the carriage for holding it against the flange thereon as a guide, said shoe having an extension projecting rearwardly beyond the carriage plate, a spring normally tending to press the movable shoe against its way, and an operating lever pivoted on the upper side of the carriage and to the extension of the sliding shoe for moving the latter away from its guide against the tension of the spring.

WILLIAM F. FOLMER.

Witnesses:
RUSSELL B. GRIFFITH,
HAROLD H. SIMMS.